United States Patent [19]
Murphy et al.

[11] Patent Number: 5,853,531
[45] Date of Patent: Dec. 29, 1998

[54] LAMINATING MACHINE

[75] Inventors: Willis A. Murphy, Deep River; Peter J. Anderson, Madison, both of Conn.

[73] Assignee: 1 Figments 5, LLC, Madison, Conn.

[21] Appl. No.: 936,443

[22] Filed: Sep. 24, 1997

[51] Int. Cl.$^6$ .................................................. B32B 31/00
[52] U.S. Cl. ........................ 156/555; 156/582; 100/176
[58] Field of Search .................................. 156/555, 580, 156/582, 583.1; 100/155 R, 160, 176

[56] References Cited

U.S. PATENT DOCUMENTS

| | | | |
|---|---|---|---|
| 2,542,901 | 2/1951 | Chaffee | 156/498 |
| 3,340,130 | 9/1967 | Dunn et al. | 156/552 |
| 3,711,355 | 1/1973 | Staats et al. | 156/499 |
| 3,901,758 | 8/1975 | Humphries | 156/499 |
| 4,116,749 | 9/1978 | Dufort et al. | 156/555 |
| 4,139,600 | 2/1979 | Singer | 156/301 |
| 4,172,750 | 10/1979 | Giulie | 156/267 |
| 4,387,000 | 6/1983 | Tancredi | 156/495 |
| 4,420,680 | 12/1983 | Itoh | 219/469 |
| 4,451,320 | 5/1984 | Marvel | 156/366 |
| 4,743,334 | 5/1988 | Singer | 156/499 |
| 5,158,641 | 10/1992 | Vermeulen et al. | 156/555 |

*Primary Examiner*—James Sells
*Attorney, Agent, or Firm*—Robert H. Montgomery

[57] ABSTRACT

A laminating machine of the type which laminates documents between sheets of plastic or a document to a substrate comprising a housing together with a first set of rolls within the housing adapted to guide the material to be laminated between upper and lower heating platens and a second set of rolls within the housing arranged to receive the material from the platens. The first set of rolls, the platens and the second set of rolls define a passage through the housing. End supports for the rolls are provided in the housing defines. The rolls are rotatably supported between the end supports. A drive motor is connected to one of the rolls at one of the end supports, and gearing means are positioned on the rolls at the other of the end supports for transmitting rotation of the driven roll to the other rolls. The upper rolls of each pair are journaled in bearing arms which are pivoted to the end supports to permit acceptance of thick substrates. Auxiliary drive means are provided to maintain all rolls in synchronization when a thick substrate causes the gears to move out of mesh.

16 Claims, 5 Drawing Sheets

LAMINATING MACHINE

FIELD OF THE INVENTION

This invention relates to plastic laminating machines and has the new capability of laminating documents, including photographs, to thick substrates such as foam board.

BACKGROUND OF THE INVENTION

Pouch laminating machines as well as roll feed laminating machines for documents are well known. The pouch machines generally comprise a pair of heated platens through which a document enclosed in the pouch is passed between drive rolls to the platens. The pouch is generally a folded over plastic material having thermal properties and adhesives thereon which will bond the plastic to the document to be protected and also the edges of the plastic sheets to each other. The pouch may be within a holder or carrier which is suitably coated to receive any overflow of adhesive material from the pouch and prevent such adhesive material from being deposited on the drive rolls.

Such laminating machines are limited in the thickness of material which may be laminated.

One laminating machine marketed by USI, Inc. of Madison, Conn. provides the ability to accept materials of slightly greater thickness than normal by permitting a small increase in separation of the entrance and exit rolls which does not exceed a dimension which would cause separation of the drive gearing.

This machine comprises a first set of entrance rolls and a second set of exit rolls on either side of upper and lower heating platens. One roll is driven by an electric motor, through gears on the shafts of the rolls and an idler gear the first and second sets of rolls are synchronized. The upper rolls of the first and second sets are journaled in somewhat flexible arms which permit acceptance of materials of a small variation in thickness. However, such variation is limited by the gear teeth. If the gearing between the rolls of each set separates feed of the material is lost.

Other examples of prior art laminating machines are shown in U.S. Pat. Nos. 2,542,901, 3,340,130, 3,711,355, 4,116,749, 4,172,750 and 4,451,320.

The prior art devices discussed above and shown by the aforementioned patents are not suitable for accepting documents of varying thickness, particularly when a thick backing such as foam board is used as a substrate.

Accordingly, the present invention provides a new and improved laminating machine in which the upper roll of a pair of rolls may pivot and move upwardly to provide clearance for thick material and auxiliary drive means are provided for driving all rolls in synchronization when the gearing of the rolls of a set of rolls move out of mesh due to the thickness of the material or a substrate therefore.

An object of this invention is to provide a laminating machine for laminating a wide range of thickness of documents which is of new and improved construction.

Another object of this invention is to provide a laminating machine for laminating documents within plastic which provides a new and improved structure for accepting documents of varying thickness, and documents on thick substrates.

SUMMARY OF THE INVENTION

Briefly stated, the invention, in one form thereof, comprises a laminating machine of a type which laminates documents between sheets of plastic in a pouch or in roll fed plastic sheet material comprising a housing, a first set of rolls within said housing member is adapted to receive a pouch, and guide said pouch between upper and lower heating platens within the housing, a second set of rolls within said housing member arranged to receive the pouch from said platens and discharge the pouch from the machine. The first set of rolls, the platens and the second set of rolls define a passage therethrough. Received within the housing in receptacles therefor are end supports for said rolls, which rotatably support the rolls therebetween. Drive means are connected to one of the rolls of one of the pairs, gearing means are provided on one of the end supports including an idler gear for transmitting rotation of one of said rolls to all of said rolls. Means are also provided for accommodating documents of varying thickness which permit separation of the rolls of each pair in accordance with the thickness of the document to be laminated. The upper rolls of each pair are journaled in members which are pivotal on the end supports to move upwardly and permit a large degree of separation of the rolls of a pair. Auxiliary drive means are connected to the ends of the rolls which provide a continuous drive for the rolls and synchronization thereof when the rolls separate a distance which causes loss of mesh of the gears between the upper and lower rolls of a pair.

The invention may also be embodied in a machine which only includes the exit rolls.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

DETAILED DESCRIPTION OF PREFERRED EMBODIMENTS OF THE INVENTION

Figure 1:
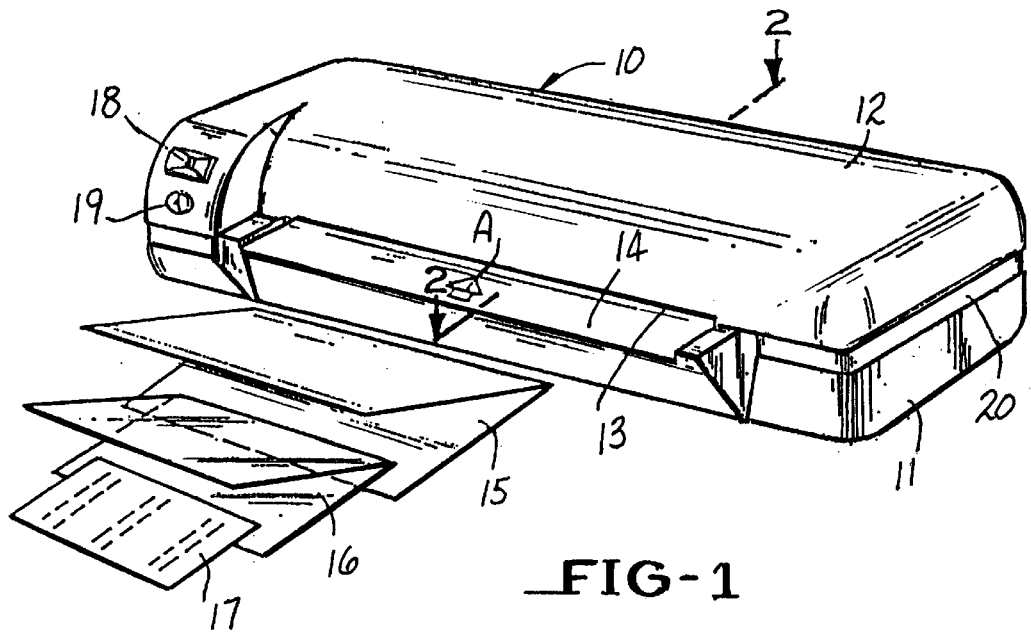
FIG. 1 is a view in perspective of a device embodying the invention.

Reference is now made to FIG. 1 which discloses a pouch laminating machine 10 embodying the invention which has a lower housing member 11 and an upper housing member 12 which is adapted to receive a document to be laminated through an entrance way 13 in the direction of arrow A. The document to be laminated is inserted into entrance 13 via a platform 14.

As is conventional with pouch laminating machines a carrier 15 is provided which generally has a waxed or otherwise coated surface to accept any overflow of adhesive from a pouch 16 in which a document 17 to be laminated is included. The pouch or packet 16 will be coated with a heat sensitive adhesive which will seal the document 17 therein. Thereafter, depending upon the size of the document, the pouch 16 may be cut or trimmed for an acceptable size.

The laminating machine thus far described is of a type referred to as a pouch laminator.

The invention may also be embodied in what is referred to as a roll laminator wherein the laminating machine includes plastic on one or more rolls which are fed into the machine over a heating shoe(s) or roller whereby adhesive substance on the plastic is heated to a bonding temperature. In such roll laminators the pouch 16 or carrier 15 are not required. The material to be protected is laminated between the plastic sheet material fed into the machine from the rolls, or on to a substrate if only one surface need be protected.

As shown in FIG. 1, there is an entrance way 13 in the direction of arrow A for acceptance of the carrier 15 with the pouch 16 and document 17 therein. Also as shown in FIG. 1, there may be an OFF and ON switch 18 and also an indicating lamp 19 to indicate that the machine is ready for operation.

The upper housing member 12 may be designed to at least telescopically fit over the lower housing member 11. Depending upon design esthetics, a band 20 may be displayed or evidenced between the lower and upper housing members 11 and 12.

The lower and upper housing members 11 and 12 respectively define opening 13 for insertion of the carrier 15 with the pouch or packet 16 and document 17 to be laminated for receipt therein.

A laminator embodying the invention may also accept other types of sheets to be laminated. For example, a document or photograph may be placed over a dry mount tissue on thick foam board or other substrate and passed through the laminator. In such case the carrier 15 may or may not be used.

Figure 2:
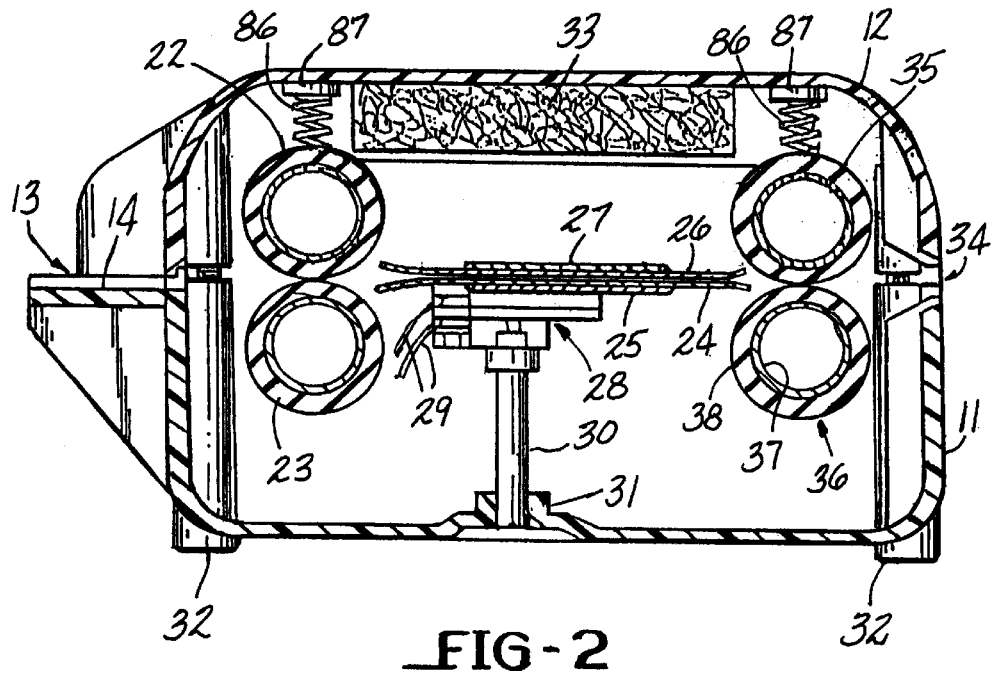
FIG. 2 is a sectional view seen in the plane of lines 2—2 of FIG. 1.

Reference is now made to FIG. 2 which is a sectional view seen along the plane of lines 2—2 of FIG. 1 and exemplifies the interior of the laminating machine 10. FIG. 2 does not show all of the elements which might be seen in the plane of lines 2—2 of FIG. 1, for clarity of illustration and purposes of description, but is presented to show the path presented by the entrance and exit rolls with the intermediate platens.

As a packet or pouch to be laminated is passed through the opening 13 over platform 14 it will initially pass between a pair of entrance rolls 22 and 23 which are driven at a constant speed and then between a lower platen 24 having a heating element 25 thereon and an upper platen 26 having a heating element 27 thereon. A thermostat 28 is in contact with one of the platens here shown as lower platen 24 to control the heat applied thereto. The reference numeral 29 designates electrical leads to the thermostat 28. Other thermostatic means may be provided for controlling the heating elements. The thermostat 28 has an adjusting rod 30 extending therefrom and through an opening 31 in the bottom of housing 11 so that it may be adjusted as by means of a screwdriver or other turning tool. Upper platen 27 may move upwardly with respect to lower platen 24 as material is passed therebetween.

The lower housing member has four feet 32 adjacent the four corners thereof for supporting the laminating machine 10.

A section of insulating material 33 is attached to the inside of upper casing member 12 to thermally isolate the top cover member 12 from the heat of the platens 24 and 26. Defined at the back of the laminating machine 10 between upper housing member 12 and lower housing member 11 is an exit opening 34 whereby the material to be laminated exits between a pair of rolls 35 and 36. Each of the rolls 22, 23, 35 and 36 comprise a metallic cylinder 37 with a rubber or plastic sleeve 38 thereabout as exemplified on roll 36 in FIG. 2, and also FIGS. 4 and 5.

Figure 3:
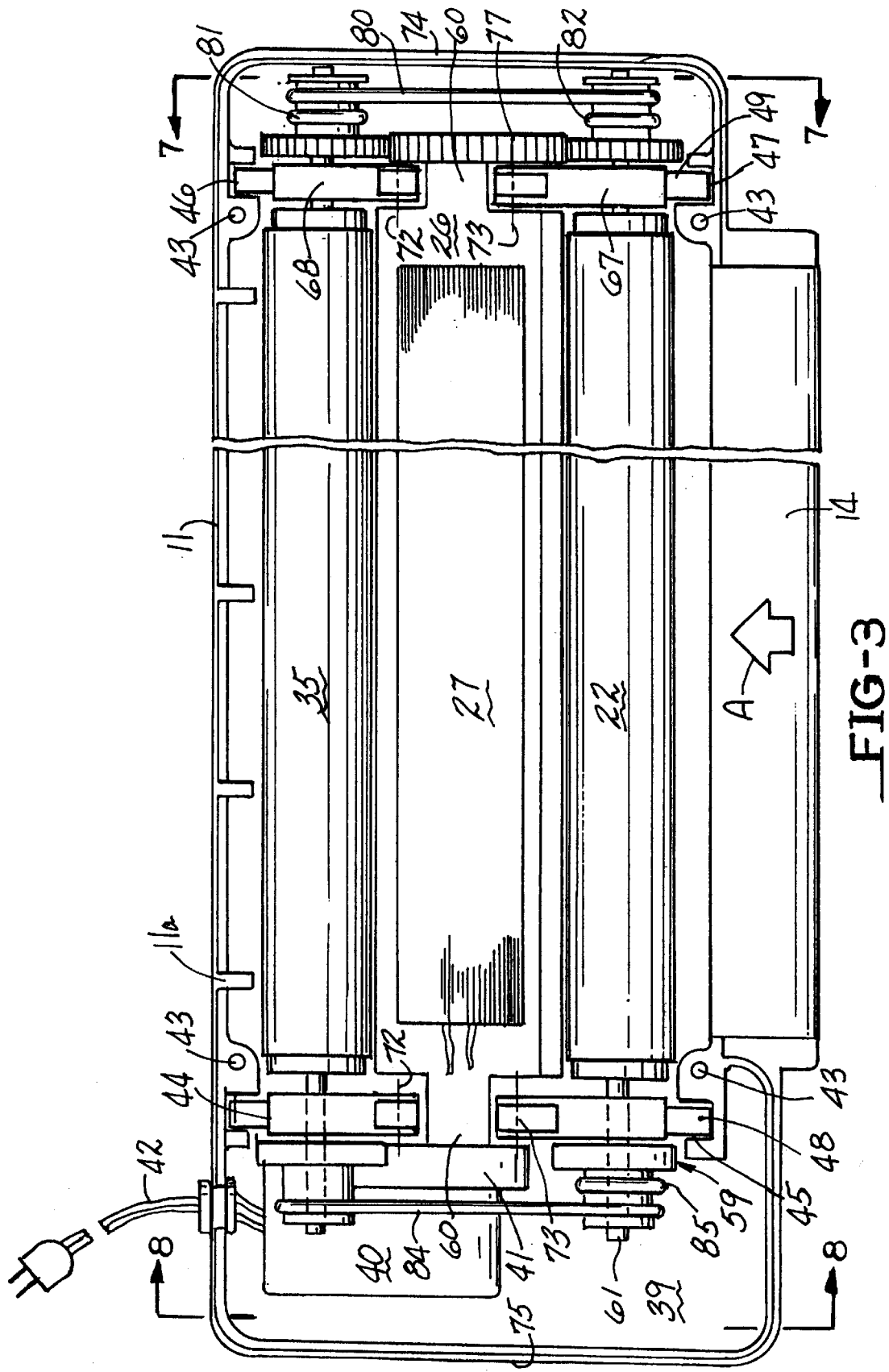
FIG. 3 is a plan view of the devices of FIG. 1, with the top cover removed.

Reference is now made to FIG. 3 which is a view of the laminating device 10 with the upper housing member 12 removed. The lower housing member 11 defines a compartment 39 which receives a drive motor 40 connected to suitable gearing 41 which drives roll 36 (not shown in FIG. 3). The reference numeral 42 represents a cord for input of electrical energy to the drive motor, thermostat and the heating elements 25 and 27, as will hereinafter be described.

The legs 32 define therein openings 43 for securing screws which will extend into the upper cover member.

The lower housing member at one end thereof defines slots or receptacles 44 and 45 and at the other end thereof defines slots 46 and 47 for end or support plates which will support the shafts of rolls 22, 23, 35 and 36 as hereinafter made apparent. Received in slots 44 and 45 is a support plate 48. Received in slots 46 and 47 is a support plate 49. Support plate 49 is shown in elevation in FIG. 6 and hereinafter described.

Figure 4:
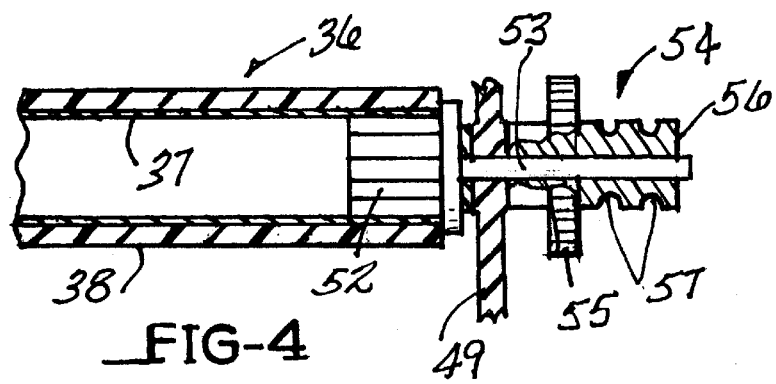
FIG. 4 is a fragmentary view, partially in section, of an end of one of the rolls of FIG. 3 exemplifying the drive coupling of the rolls.

Reference is now made to FIG. 4 which illustrates roll 36, in part at the non-driven end. Roll 36 as previously described comprises cylinder 37 with sleeve 38 thereon. A journal member 51 has an insert portion 52 frictionally received within cylinder 37 or key coupled thereto and a journal shaft portion 53 extending through a bearing opening in end wall 49.

Shaft 53 has thereon a power transmission member 54 which includes a gear 55 and a pulley 56. The gear and pulley may be integral and made of a plastic material such as nylon. Pulley 56 has two annular grooves 57 defined therein which accept pulley belts which may be O-rings.

Figure 5:
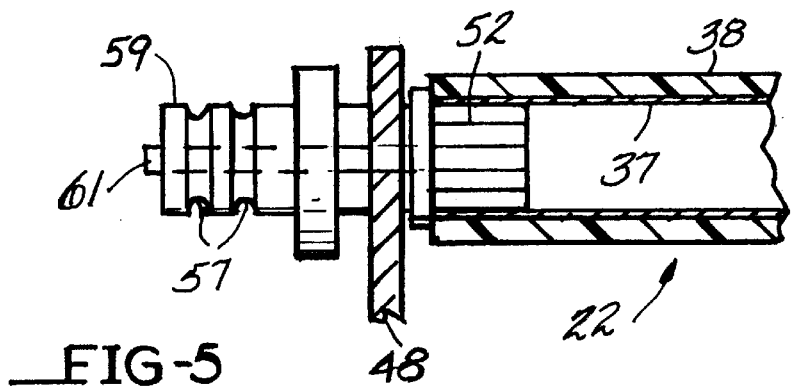
FIG. 5 is a fragmentary view, partially in section of the other end of another roll of FIG. 3.

Another power transmission member 59 is shown in FIG. 5 which is utilized at the non-geared ends of the rolls. Member 59 omits a gear but is provided with two belt grooves 57. Member 59 is shown attached to roll 22 in FIG. 3 and provides journal shaft 61 for roll 22.

FIG. 4 is representative of the right hand ends of rolls 22, 23, 35 and 36, as viewed in FIG. 3. FIG. 5 is representative of the left hand ends of rolls 22, 23 and 35 as viewed in FIG. 3.

Hereinafter, reference will only be made to the structures of FIGS. 4 and 5 as the gears and/or pulley on the left or right hand ends of rolls 22, 23, 35 and 36 as viewed in FIG. 3 to avoid superfluous reference numerals.

Figure 6:
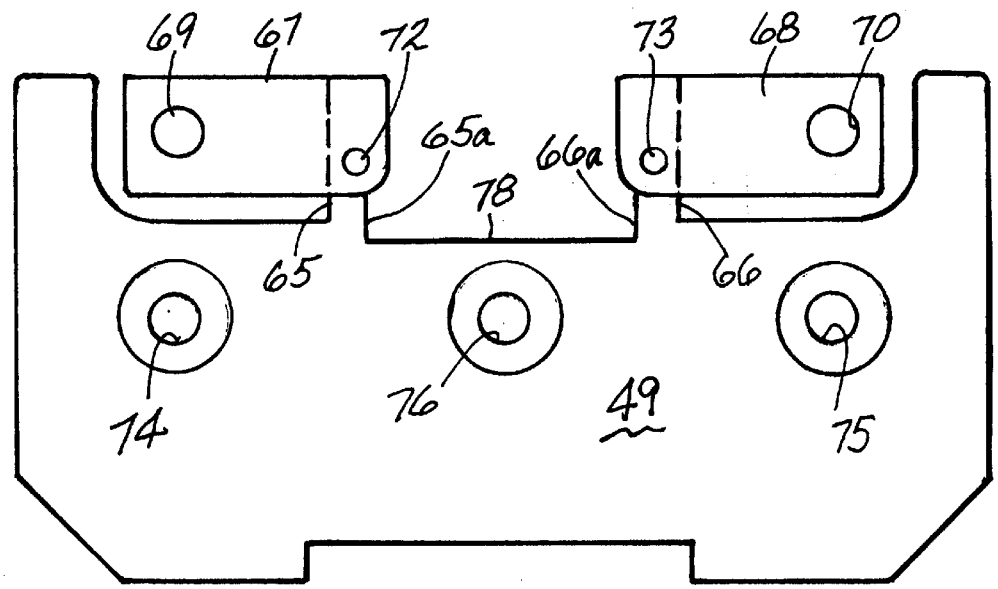
FIG. 6 is a view in elevation of an end support for the rolls.

Reference is now made to FIG. 6 which shows end plate 49. End plates 48 and 49 are identical and only one need be shown. End plate 49 has two upstanding arms 65 and 66 to which are pivoted bearing arms 67 and 68 respectively. The bearing arms define bearings 69 and 70 to receive the journal shafts 53 of rolls 22 and 35. The same bearings on end support 48 will receive the shaft 61 of rolls 22 and 35.

The bearing arms define bearing arm pivots 72 and 73 whose axes are shown in broken line in FIG. 3. Also defined are bearings 74 and 75 for the shafts of rolls 23 and 36 (FIG. 2), respectively, and a bearing 76 which receives a shaft for an idler gear 77 (FIG. 3). Platens 24 and 27 have end portions 60 (FIG. 3) which are supported on edges 78 of end supports 48 and 49.

The arms 65 and 66 have notches 65a and 66a, respectively, defined therein which receive the edges of end portion 60 of the platens and prevent any undue separation of the platens and also retain the platens in place should the machine be turned upside down.

Figure 7:
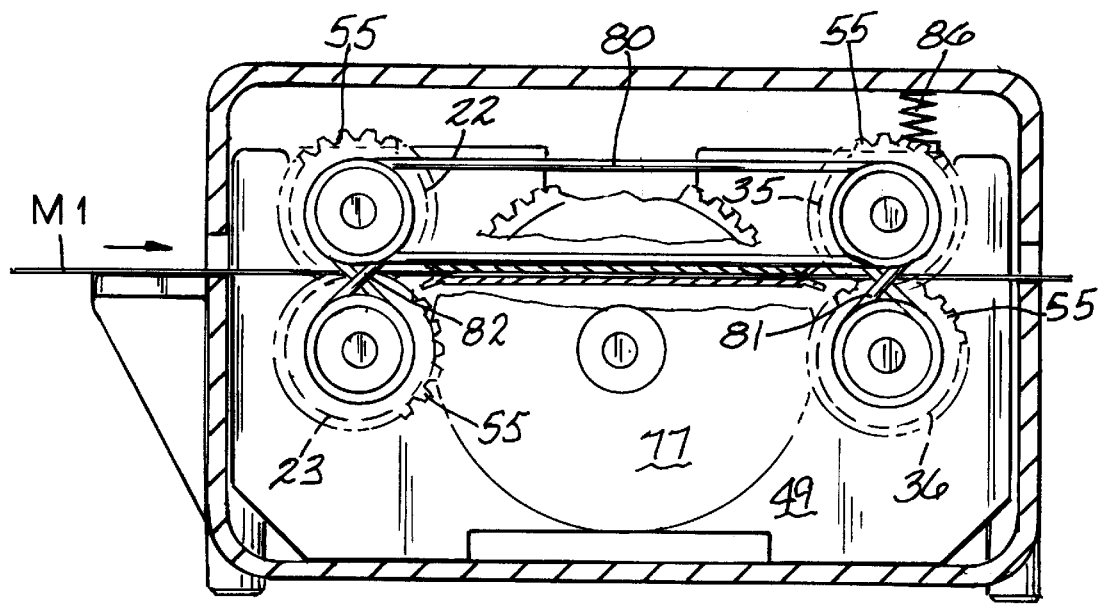
FIGS. 7 and 7a are views seen in the plane of lines 7—7 of FIG. 3 under different operating conditions.

Reference is now made to FIG. 7 taken in conjunction with FIG. 3. FIG. 7 exemplifies the roll drive system when relatively thin material M1 is being laminated. The gears 55 on the end of rolls 35 and 36 are meshing. The rolls 22, 23, 35 and 36 are shown in broken line behind the gears. Gear 55 on roll 36 also drives idler 77. Idler 77 drives gear 55 on roll 23 which in turn drives gear 55 on roll 22. Thus all of the rolls are driven in synchronization to pass material between the platens.

A pulley belt 80 extends about the pulleys 56 of rolls 22 and 35 in one of grooves 57 (FIG. 4). A pulley belt 81 connects the pulleys 56 of rolls 35 and 36. A pulley belt 82 connects the pulleys 56 of rolls 22 and 23.

Figure 8:
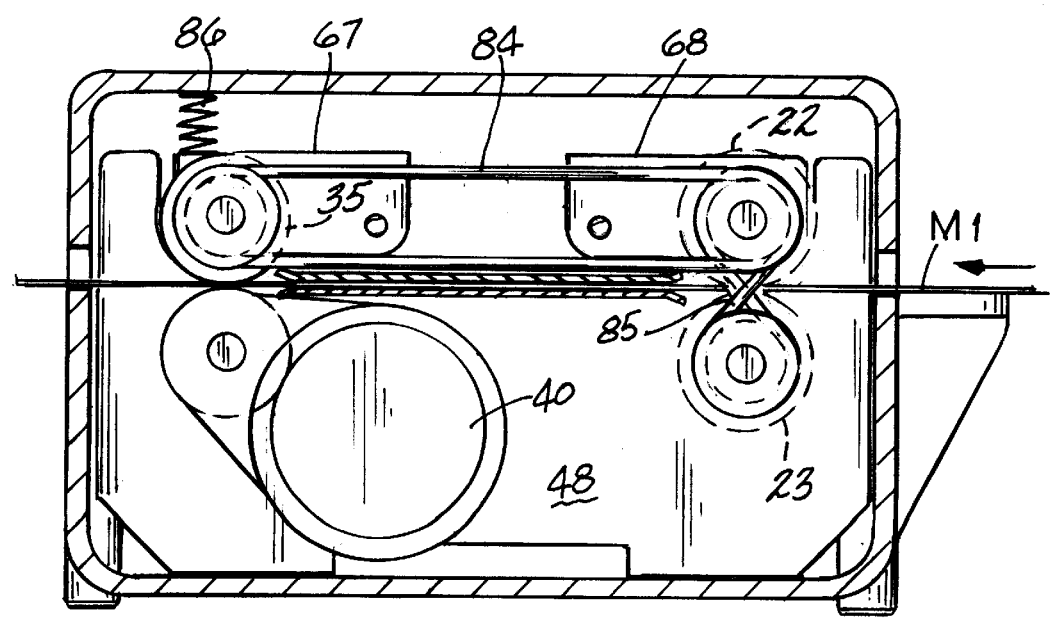
FIGS. 8 and 8a are views seen in the plane of lines 8—8 of FIG. 3 under different operating conditions.

Four springs 86 mounted in housing member 11 bear on bearing arms 67 and 68 on each of supports 48 and 49. Only two springs 86 are shown in FIGS. 7 and 8 for simplicity of illustration. Springs 86 together with spring seats 87 are shown in more detail in FIG. 2. The springs 86 act to maintain upper rolls 22 and 35 in contact with material M1.

Reference is now made to FIG. 8, taken in conjunction with FIG. 3. A pulley belt 84 connects the pulleys 59 of rolls 22 and 35, and a pulley belt 85 connects the pulleys 59 of rolls 22 and 23.

The upper belts 80 and 84 are not absolutely necessary, but are provided for insurance of power transmission. Depending on the size of the machine and the degree of separation of the upper and lower rolls of a pair the number of belts 80 and 84 may be increased on the pulleys at each end.

It will be apparent that the gears on rolls 23 and 36 are always in mesh. Therefore it is necessary to have rolls 22 and 35 in sychronized speed of rotation.

Depending on the maximum thickness of a material M2 and the adhesion of the belts 81, 82 and 85 on their respective pulleys, the belts 80 and 84 may be eliminated. However, for practical purposes, the belts 80 and 84 give insurance that all rolls are in synchronization at all times when the gears on rolls 22 and 35 go out of mesh with the gears on rolls 23 and 36, respectively.

In operation, roll 36 drives roll 35 and also idler gear 77. Idler gear 77 drives roll 23 which in turn drives roll 22. Rolls 22 and 23 accept material M1 and convey it between platens 24 and 27 to exit rolls 34 and 36. The pulley and belt drives are not the primary roll drives at this time since the gears are in mesh.

Figure 7A:
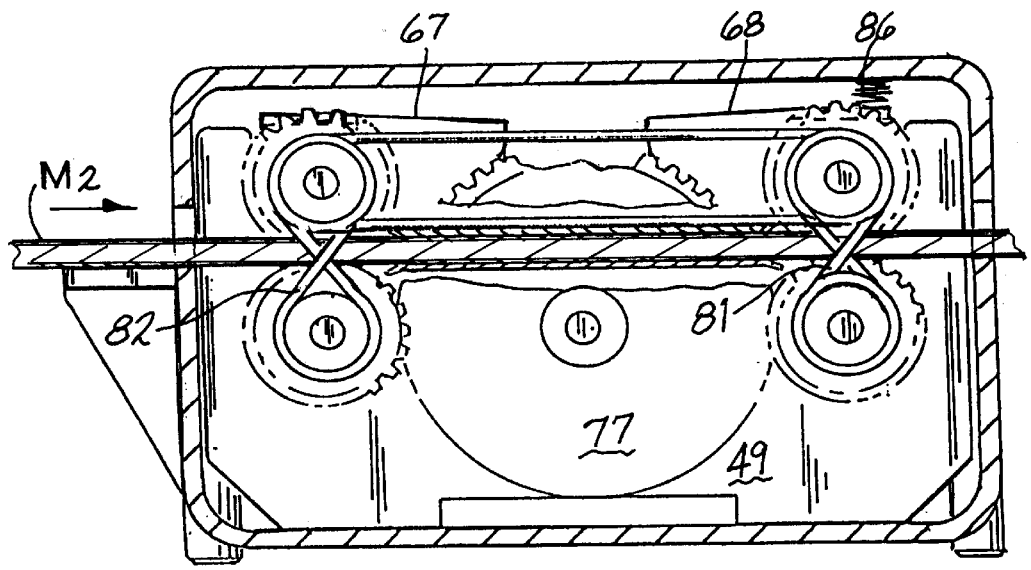
Figure 8A:
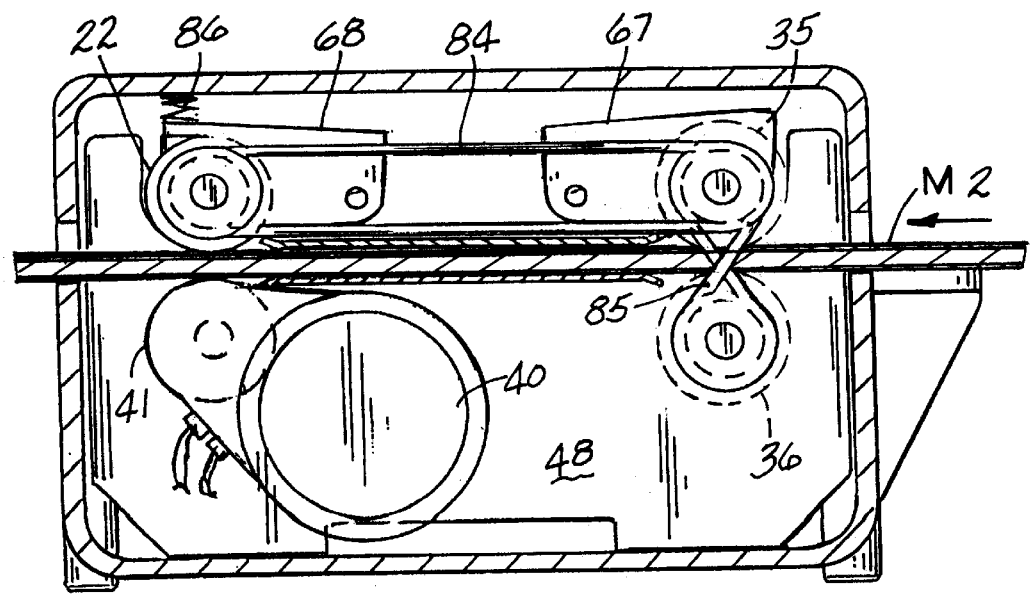

Reference is now made to FIGS. 7a and 8a which exemplify the operation of machine 10 when a thick material M2 is passed through the machine which will cause the gears of rolls 22 and 23 to separate and lose mesh and the gears of rolls 35 and 36 to separate and lose mesh.

As the thick material M2 goes between the roll pairs the bearing arms 67 and 68 pivot upwardly to accept material M2 and the gears of each pair of rolls are not in contact.

Roll 36 will drive roll 35 through pulley belt 81 and roll 22 through pulley belt 80. Roll 22 will drive roll 23 through belt 82. Thus all rolls are still in synchronization even though the primary gear drive is disengaged.

The pulley belts 81, 82 and 85 also provide a downward bias on upper rolls 22 and 35 to maintain and ensure that the upper rolls are in driving contact with a thick material M2.

The lower rolls 23 and 36 are always gear connected through idler gear 77 and thus rotate at a predetermined speed. The pulley drive system ensures that the upper rolls 22 and 35 will rotate at the same speed in synchronization with driven roll 36.

A laminator embodying the invention may also be constructed using only one pair of rolls. In such embodiment the exit rolls 35 and 36 would be used with power transmission members 54 as shown in FIG. 4 and with only pulley belt 81. Only one bearing arm 68 or 69 would be used on each end support to permit upward pivotal movement of roll 35. Roll 36 would drive roll 35 through the gearing on the non-driven ends as shown in FIG. 4.

It may thus be seen that the objects of the invention set forth above as well as those made apparent are efficiently attained. While preferred embodiments of the invention have been set forth for purposes of disclosure, modifications of the disclosed embodiments as well as other embodiments of the invention may occur to others which do not depart from the spirit and scope of the invention. Accordingly, the appended claims are intended to cover all embodiments of the invention as well as modifications to the disclosed embodiments which do not depart from the spirit and scope of the invention.

What is claimed is:

1. A laminating machine which comprises upper and lower platens defining a passage therethrough for material to be laminated, upper and lower rolls for accepting material passed between said platens, end support members for said rolls, drive means connected to the lower of said rolls at one end thereof, normally meshing gears on said rolls at the ends opposite said drive means whereby said lower roll may drive said upper roll, means pivotally mounting said upper roll to said end support members whereby said upper roll may pivot upwardly, pulley means on each of said rolls and a belt connecting said pulley means whereby said lower roll may drive said upper roll when said upper roll pivots upwardly to an extent where said gears are out of mesh.

2. The machine of claim 1 wherein said gearing member and said pulley means are integral members on said rolls.

3. The machine of claim 1 wherein said belt connecting said pulley means also serves to bias said upper roll downwardly toward said lower roll when said rolls tend to be separated by material being laminated.

4. The machine of claim 1 wherein said platens and said rolls are contained within a housing and biasing means are provided in said housing acting on said pivotal mounting means to bias said upper roll toward said lower roll.

5. A laminating machine of the type which laminates documents between sheets of plastic or on a substrate comprising a housing, a first set of rolls having end shafts within said housing adapted to receive material to be laminated and move said material between upper and lower platens within said housing, a second set of rolls having end shafts within said housing arranged to receive the material from said platens and discharge the material from the machine, end supports in said housing for said roll shafts, said roll shafts adapted to be rotatably supported between said end supports, drive means connected to one of said rolls of said one of said sets at one of said end supports and gearing means on said rolls at the other of said end supports for transmitting rotation of said one of said rolls to the other of said rolls, means pivotally mounted to said end supports rotatably supporting the upper rolls of each pair of rolls whereby said upper rolls of each pair may pivot upwardly to accommodate material of various thickness, and power transmission means connecting said rolls to maintain synchronization of rotation of said rolls if said upper rolls should separate from said lower rolls to an extent which would cause said gearing means to move out of mesh.

6. The machine of claim 5 wherein said power transmission means comprise pulleys on the shafts of said upper and lower rolls and a resilient belt about the pulleys of each pair of rolls.

7. The machine of claim 6 wherein said belts connecting the pulleys of each pair of rolls also serve to bias said upper rolls of each pair of rolls downwardly toward said lower rolls when said gears are separated by material being laminated.

8. The machine of claim 6 wherein said gearing means and said pulleys are integral on said roll shafts.

9. A laminating machine of the type which laminates documents between sheets of plastic or on a substrate comprising a housing, first and second sets of upper and lower rolls within said housing having end shafts, one of said sets of rolls arranged to receive material to be laminated and move said material to the other of said sets of rolls which discharges the material from said housing, end supports in said housing rotatably supporting said end shafts, drive means connected to a lower roll of one of said sets of rolls adjacent one of said end supports, gearing means on said rolls at the other of said end supports for transmitting rotation of said lower roll of said one set of rolls to the others of said rolls, said gearing means comprising gears on the shafts of each of said rolls, an idler gear between the gears of said lower rolls and the gears of each pair of rolls being in mesh, said upper roll of each pair of rolls mounted in said end supports to move upwardly to accommodate material of variable thickness and resilient auxiliary power transmission means connected to said upper rolls and driven from said lower of said one set of rolls to maintain synchronization of rotation of said upper rolls with said lower rolls if said upper rolls should separate from said lower rolls to an extent which would cause the gears of said upper and lower rolls to go out of mesh.

10. The machine of claim 9 wherein the shafts of said upper rolls of each pair are received in bearing members which are pivoted to said end supports.

11. The machine of claim 9 wherein said auxiliary power transmission means comprises a pair of pulley belts about said end shafts of each of said upper rolls.

12. The machine of claim 10 wherein said auxiliary power transmission means comprise a pulley belt about the shafts of each pair of rolls.

13. The machine of claim 11 wherein said pulley belts serve to bias said upper rolls of each pair downwardly when said gears on said upper and lower rolls are separated by material being laminated.

14. A laminating machine which comprises upper and lower rolls for accepting material to be laminated therebetween, end support members for rotatably supporting said rolls, drive means connected to the lower of said rolls at one end thereof, normally meshing gears on said rolls at the ends opposite said drive means whereby said lower roll normally drives said upper roll through said normally meshing gears, means mounting said upper roll to said end support members and permitting upward movement of said upper roll, pulley means on each of said rolls and a resilient belt connecting said pulley means whereby said lower roll may drive said roll in synchronism when said upper roll moves upwardly to an extent where said gears go out of mesh.

15. The machine of claim 14 wherein said belt connecting said pulley means also serves to bias said upper roll downwardly toward said lower roll when said rolls tend to be separated by material being laminated.

16. The machine of claim 14 further including heating platens defining a path for material to be laminated to pass therethrough.

* * * * *